United States Patent [19]

Turner

[11] Patent Number: 4,499,995
[45] Date of Patent: Feb. 19, 1985

[54] VIDEO DISC PACKAGE

[75] Inventor: Robert L. Turner, Mooresville, Ind.

[73] Assignee: RCA Corporation, New York, N.Y.

[21] Appl. No.: 488,298

[22] Filed: Apr. 25, 1983

[51] Int. Cl.³ .............................................. B65D 85/30
[52] U.S. Cl. .................................. 206/312; 206/313; 206/444; 360/133; 156/73.5
[58] Field of Search ............... 206/303, 307, 311, 312, 206/313, 444; 360/131, 133; 156/73.3, 73.4, 73.5; 228/166, 168

[56] References Cited

U.S. PATENT DOCUMENTS

| | | | |
|---|---|---|---|
| 2,662,277 | 12/1953 | Stone | 228/168 |
| 3,668,658 | 6/1972 | Flores et al. | 206/303 |
| 3,860,248 | 1/1975 | Hunt et al. | 206/444 |
| 3,949,873 | 4/1976 | Platt | 206/311 |
| 3,951,264 | 4/1976 | Heidecker et al. | 206/303 |
| 4,068,436 | 1/1978 | Sato | 228/168 |
| 4,159,768 | 7/1979 | Mannis et al. | 206/303 |
| 4,159,827 | 7/1979 | Torrington | 206/444 |
| 4,216,895 | 8/1980 | Holmes | 222/166 |
| 4,310,371 | 1/1982 | Appoldt et al. | 206/444 |
| 4,316,539 | 2/1982 | Torrington | 206/444 |
| 4,377,428 | 3/1983 | Toth | 156/73.5 |
| 4,410,921 | 10/1983 | Yamamura | 206/444 |

Primary Examiner—Joseph Man-Fu Moy
Assistant Examiner—David Fidei
Attorney, Agent, or Firm—Paul J. Rasmussen; William H. Meise; Dilip A. Kulkarni

[57] ABSTRACT

A video disc sleeve comprises a U-shaped enclosure, and a pair of T-shaped side rails which are ultrasonically welded to the enclosure to form the package. The inside surfaces of the T-rails are inclined away from the respective intermediate flange portions to accommodate excess molten plastic during welding to produce clean and uniform welds.

4 Claims, 13 Drawing Figures

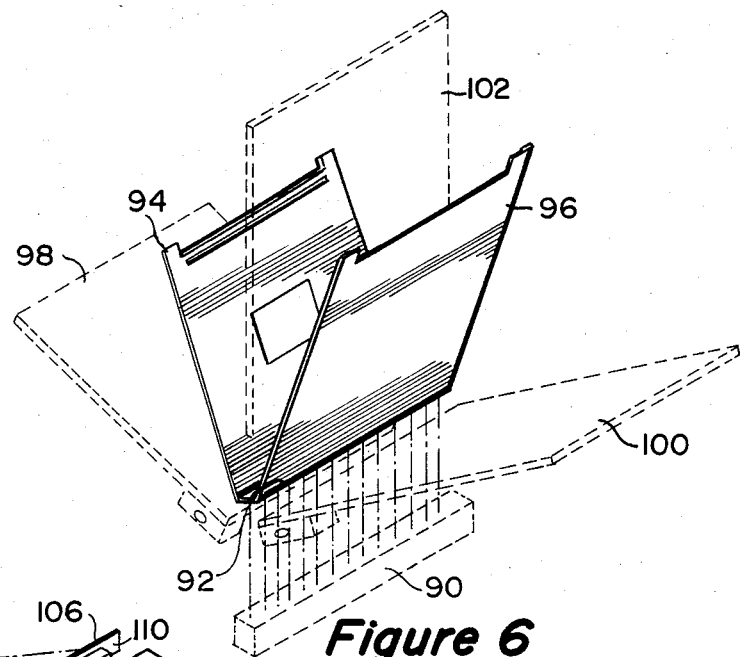
Figure 6
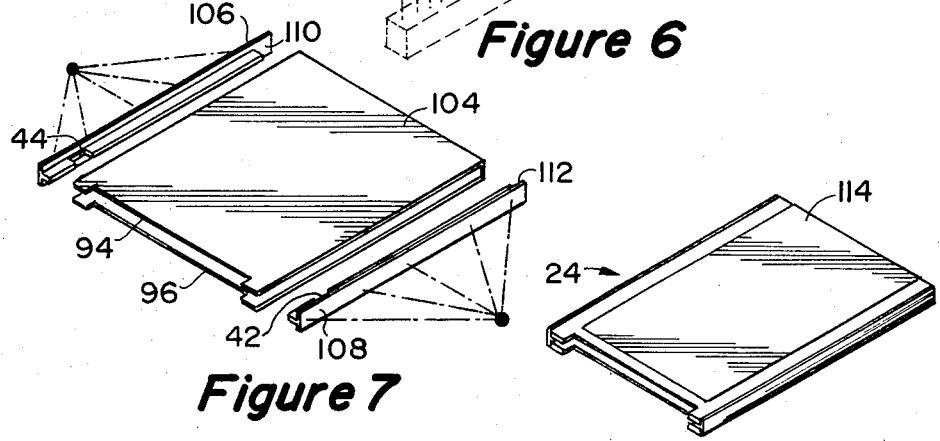
Figure 7
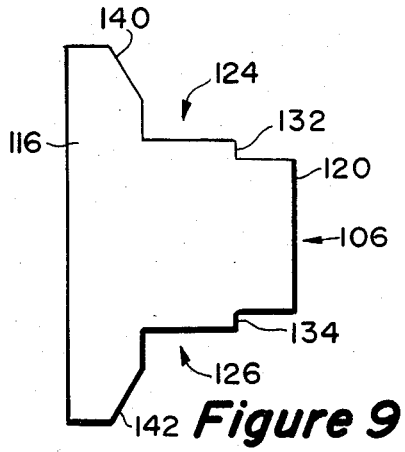
Figure 9
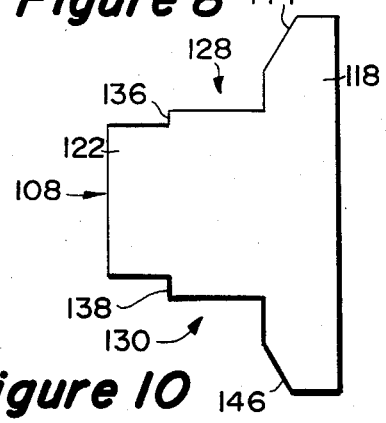
Figure 8
Figure 10

VIDEO DISC PACKAGE

This invention relates to a disc record package, and more particularly, to an inexpensive record package.

In certain systems, picture and sound signals are stored on a disc record in the form of physical undulations in a continuous spiral track disposed on the record surface. The variations in electrical capacitance between an electrode disposed on a record-engaging stylus and a conductive property of a turntable-supported record are sensed as the physical undulations on the record surface pass beneath the stylus tip. The capacitive variations are converted into electrical signals suitable for application to a conventional television receiver.

It is beneficial to enclose a video record in a caddy which comprises a record retaining spine removably located within an outer sleeve. The record retaining spine has an opening in which a record is received to form a record/spine assembly. The record retaining spine is provided with a pair of spaced apart locking fingers disposed at the opposite edges thereof to releasably secure the spine to the sleeve. The caddy sleeve is covered with a wrap-around label containing program information and graphics. For record loading, a full caddy is inserted into an input slot provided in the player along a pair of caddy guide rails. A record extraction mechanism disposed in the player removes the record/spine assembly from the sleeve when the sleeve is withdrawn to leave the record/spine assembly inside the player resting on a set of record receiving pads. The retained record is then transferred by a record handling mechanism to a turntable for playback. For record retrieval, the record is transferred back to the receiving pads, and an empty jacket is reinserted into the player to recapture the record/spine assembly.

In U.S. patent application, Ser. No. 444,000, filed for Prusak et al., an inexpensive sleeve design is disclosed. The Prusak et al. sleeve comprises a U-shaped enclosure, and a pair of extruded, T-shaped side rails fixedly secured to the U-shaped enclosure to form an edge opening in communication with a record enclosing cavity.

The U-shaped enclosure of Prusak et al. consists of a pair of spaced panel portions interconnected by an elongated end portion along one side of the panel portions. Each of the side rails has an edge wall portion and an intermediate flange portion extending substantially perpendicularly from the edge wall portion to define a pair of channels. Each of the side rails is provided with a slightly raised step portion on each side of the intermediate flange portion. The perpendicular flange portions of the side rails are inserted and held between the respective side edges of the panel portions such that the edge wall portions of the side rails are substantially flush with the side edges of the panel portions. Both the U-shaped enclosure, and the two T-rails are made from suitable plastic material (e.g., polystyrene). The flange portions of the side rails are fused to the side edges of the panel portions by the application of ultrasonic energy to complete the assembly.

It is possible that the molten plastic from the side rail channels might get trapped between the outer edges of the panel portions and the interior surfaces of the edge wall portions of the side rails to produce discontinuities along the edges. It is also possible that the molten plastic from the step portions might form flash along the side edges of the enclosure.

To overcome these and other problems, the inside surfaces of the edge walls of the side rails, in accordance with this invention, are tapered away from the intermediate flange portions. The beveled side rails eliminate flash, and produce uniform joints.

In the Drawings:

FIG. 1 shows a plastic video disc caddy comprising a record retaining spine, and an outer sleeve constructed according to the principles of the subject invention;

FIGS. 2–8 schematically illustrate the sequence of events involved in the fabrication of the instant caddy sleeve;

FIGS. 9 and 10 depict the cross-sectional views of the side rails of the caddy sleeve of FIG. 1;

Figure 1:
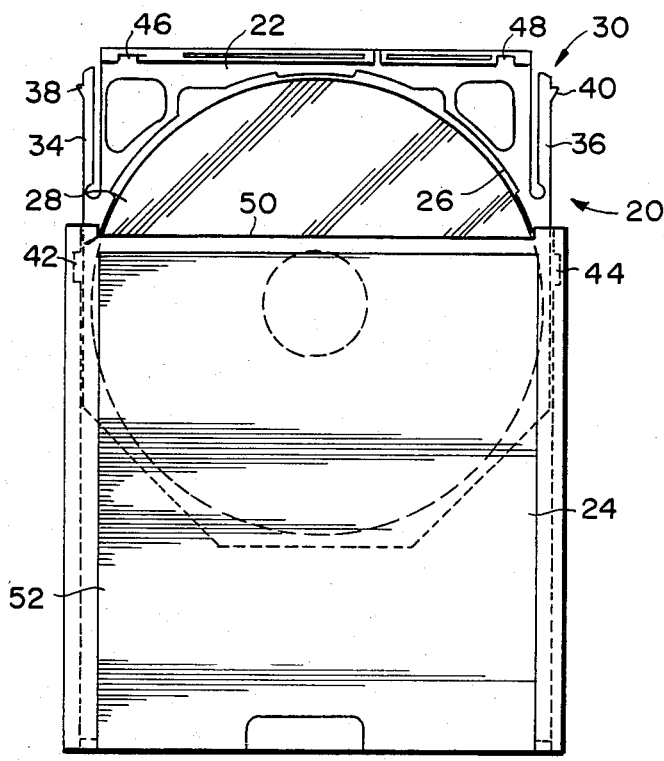
Figure 2:
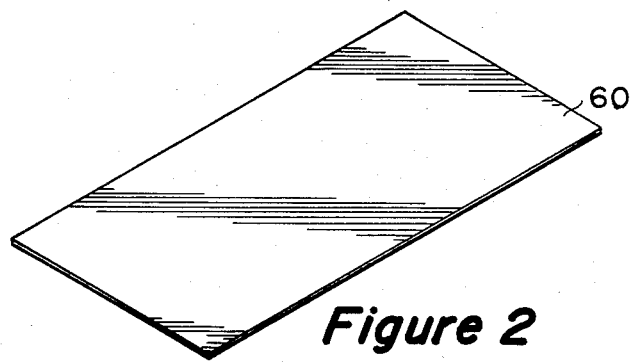

The video disc caddy 20, depicted in FIG. 1, consists of a planar injection-molded record retaining spine 22 removably enclosed in a flat outer sleeve 24 made in accordance with this invention. The retaining spine 22 has an opening 26 in which a centrally-apertured record 28 is received forming a record/spine assembly 30. Integrally molded with the spine 22 are spine locking fingers 34 and 36 for releasably securing the spine 22 in its sleeve 24. The spine locking fingers 34 and 36 are fitted with protruding elements 38 and 40 which are received in the respective recesses 42 and 44 provided in the sleeve 24 to hold the spine 22 in place. The spine 22 has outputs 46 and 48 in which the respective spine latching members of a record extraction mechanism are received to secure the spine to the player, so that the record/spine assembly 30 is retained inside the player when the caddy sleeve 24 is withdrawn. The caddy sleeve 24 has a record access opening 50 in communication with a record enclosing cavity 52.

Figure 3:
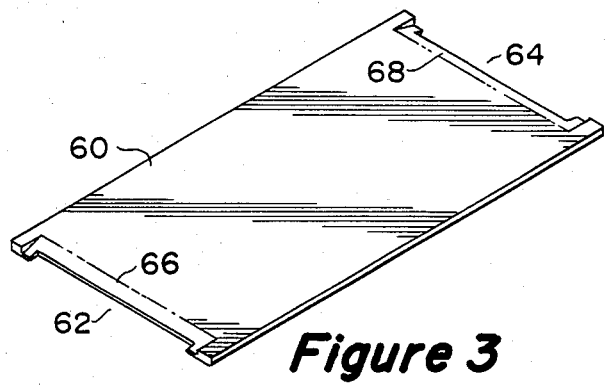

The construction of the caddy sleeve 24 will now be explained in conjunction with FIGS. 2–8. A flat extruded polystyrene sheet 60 is trimmed to size. Illustrative dimensions of the plastic sheet, in inches, are 0.070 thick×12.690 wide×28.165 long. Any suitable material, e.g., polystyrene, is extruded into a flat sheet which is either cut into individual pieces or stored in a roll form for the subsequent die cutting and trimming operations. The flat sheet 60 is die cut at both ends to form cutouts 62 and 64 for reception of the front wall of the spine 22 such that the front edge of the spine is flush with the front edge of the outer sleeve 24. The lead-in edges of the flat sheet 60 are beveled at both ends 66 and 68, as shown in FIG. 3, to facilitate insertion of the record/spine assembly 30 into the caddy sleeve 24. The bevels 66 and 68 are cold formed. The die cutting and beveling operations are performed simultaneously at a single station.

Figure 4:
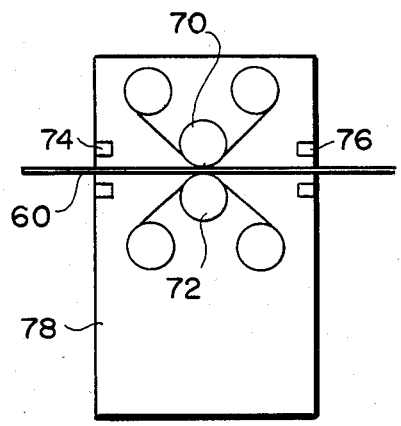

The recessed and beveled plastic sheet 60 is then cleaned by passing it through a set of cleaning rollers 70 and 72 depicted in FIG. 4. Any suitable cleaning cloth can be used—for example, wiping fabric made by 3M Company. The plastic sheet is passed through a set of antistatic bars 74 and 76 at both the feed end and the output end of the cleaning machine 78 to get rid of any accumulated electrostatic charges.

Figure 5:
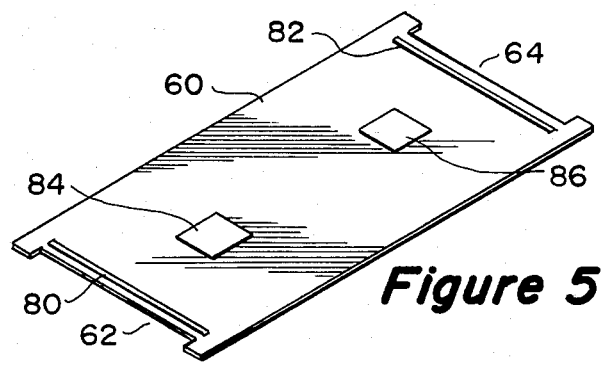

A pair of lip seal pads 80 and 82 and center pads 84 and 86 are then applied to the plastic sheet 60 in the manner shown in FIG. 5. The lip pads 80 and 82 serve to prevent scuffing and debris generation during record insertion and extraction. They also serve to keep dust and debris from entering into the record enclosing cavity 52. The center pads 84 and 86 protect the record 28 by providing soft sliding surfaces at the disc/caddy interfaces. The pads can be made from any suitable material—such as Sontara made by Dupont. The pads are covered with pressure sensitive adhesive on one side, and are die cut and firmly seated in place.

The heat from a pair of line-focus heaters 90 is applied to a narrow folding section 92 disposed between the panel portions 94 and 96 of the plastic sheet 60 for a preset time (e.g., 3 to 4 seconds) in the manner schematically shown in FIG. 6. The temperatures of the plastic sheet 60 in the folding line region 92 is raised to about 325° F. A pair of water-cooled folding plates 98 and 100 fold the plastic sheet 60 at the heated folding line 92 to cause the panel portions 94 and 96 to wrap around a spacer plate 102 to define a U-shaped enclosure 104 illustrated in FIG. 7. The temperature of the water circulated through the folding plates 98 and 100 is chilled to approximately 55° F. The folding plates 98 and 100 are held in the folded-up position for about 4 to 5 seconds, and then shifted back to the flat position. The thickness of the spacer plate 102 defines the caddy internal clearance (e.g., 0.110±0.040 inches).

A pair of T-shaped side rails 106 and 108 are ultrasonically welded to the enclosure 104 as diagrammatically shown in FIG. 7 to form the caddy sleeve 24. The side rails 106 and 108 are equipped with notches 110 and 112 at their respective ends to accommodate the narrow midportion 92 of the enclosure 104. The caddy sleeve 24 is then covered with a heat-seal, wrap-around label 114 having appropriate graphics as indicated in FIG. 8. The label 114 is made from any suitable material (e.g., 6-point Tyvec manufactured by DuPont).

FIGS. 9 and 10 show the cross-sectional views of the side rails 106 and 108. The side rails 106 and 108 comprise edge wall portions 116 and 118 and perpendicularly-disposed, intermediate flange portions 120 and 122. The side edges of the panel portions 94 and 96 of the enclosure 104 are subject to reception in the respective channels 124, 126 and 128, 130 of the side rails 106 and 108. The application of the high frequency vibrations (e.g., 20,000 to 40,000 cycles per second) to the side rails 106 and 108 during the ultrasonic welding operation produces, through surface and intermolecular friction, sharply high temperatures at the joint area causing the plastic to melt. When the vibrations stop, the material solidifies under pressure to provide the required connection between the parts.

To produce a good bond between the enclosure 104 and the side rails 106 and 108, the intermediate flange portions 120 and 122 are fitted with slightly raised step portions (known as energy directors in the art) 132, 134 and 136, 138. The step portions 132-138 ensure that there is sufficient molten plastic to adequately cover the joint area.

As previously noted, the excess molten plastic has a tendency to form beads around the side edges of the enclosure 104. To prevent flashing or beading around the edges, the T-rails 106 and 108 are provided with slanted surfaces 140, 142 and 144, 146 in accordance with this invention. The principles of the subject invention will be explained in conjunction with FIGS. 11-13.

Figure 11:
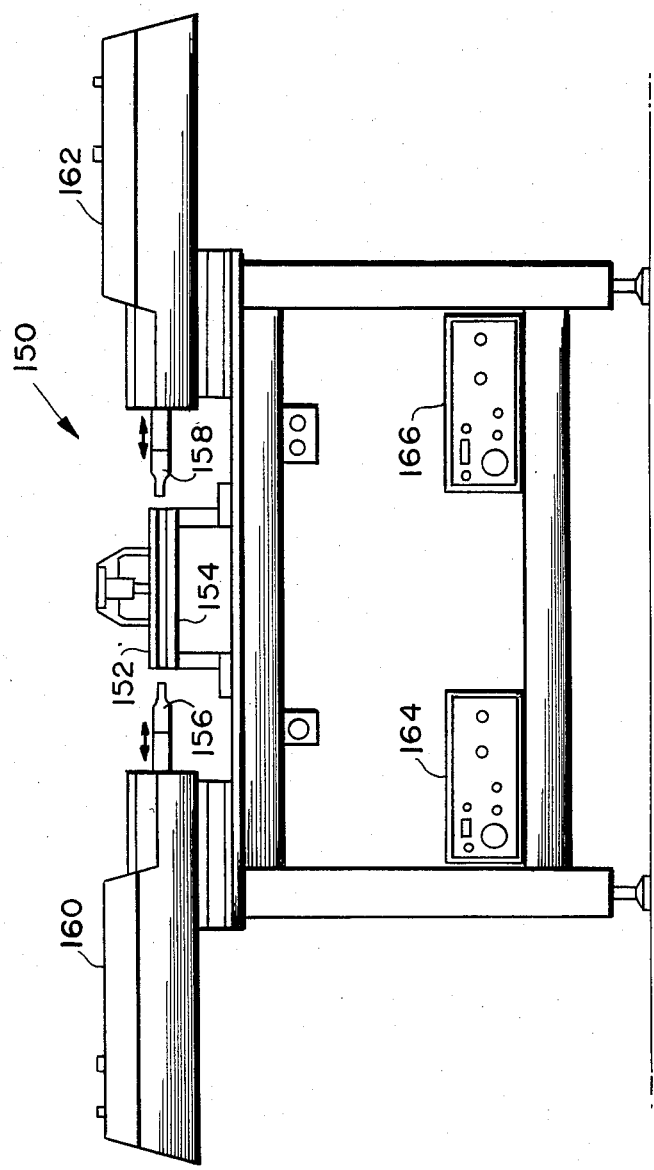
FIG. 11 shows the caddy welding machine used for ultrasonically welding the side rails to the U-shaped enclosure to form the FIG. 1 caddy sleeve.
Figure 12:
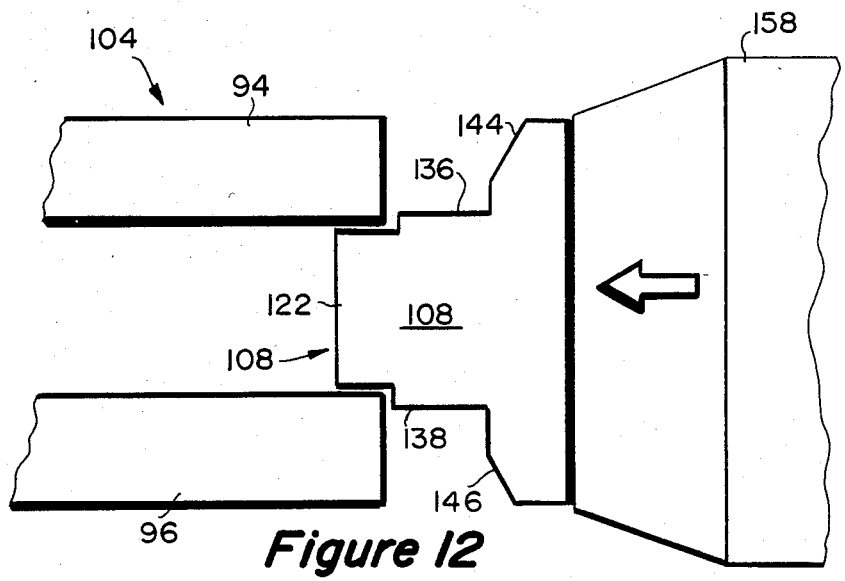
FIGS. 12 and 13 indicate the sequence of steps involved in the caddy welding operation.

FIG. 11 shows an ultrasonic welding machine 150 for welding the side rails 106 and 108 to the enclosure 104. The U-shaped enclosure 104 is inserted between a pair of spaced platens 152 and 154. A flat spacer plate (not shown) is placed between the panel portions 94 and 96 to hold proper internal clearance during the welding operation. The side rails 106 and 108 are positioned by inserting the perpendicularly-disposed flanges 120 and 122 between the side edges of the panel portions 94 and 96 in the manner indicated in FIG. 12. The welding machine 150 is equipped with a pair of horns 156 and 158 for applying ultrasonic vibrations to the respective side rails 106 and 108 to cause them to fuse to the enclosure 104. As the energy is applied to the side rails 106 and 108, the horns 156 and 158 are driven in to gradually bring the step portions 132-138 of the side rails into contact with the side edges of the panel portions 94 and 96 of the enclosure 104 in the fashion shown in FIGS. 12 and 13 to provide uniform and clean welds. The horns 156 and 158 are energized by respective actuators 160 and 162, which are, in turn, driven by individual power supplies 164 and 166. In this particular embodiment, the power supplies, actuators and horns are all made by Branson Sonic Power Company. The power supplies are Branson 800 series, Model 187P-1500 watts. The actuators are Branson Model 871, series 800.

Figure 13:
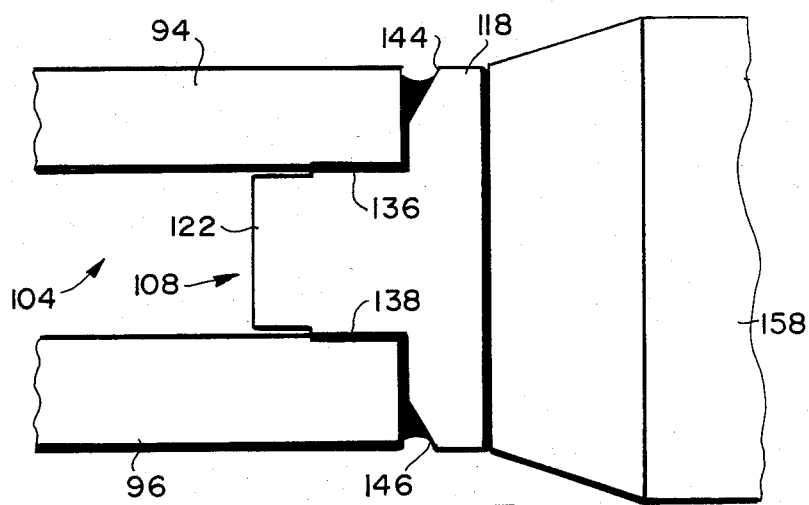

The inclined surfaces 140, 142 and 144, 146 of the side rails 106 and 108 provide room for excess molten plastic from the respective channels 124, 126 and 128, 130 during the welding operation in the manner shown in FIG. 13. This produces clean welds without beading along the edges of the enclosure 104.

What is claimed is:

1. A disc record package consisting of a substantially U-shaped, plastic enclosure, and a pair of plastic, T-cross sectioned side rails; said U-shaped enclosure comprising a pair of spaced panel portions interconnected by an end portion along one side of said panel portions; each of said side rails having an edge wall portion and an intermediate flange portion extending substantially perpendicularly from said edge wall portion to define a pair of channels; each of said side rails having an integral raised step portion in each channel thereof; said perpendicular flange portions being inserted between the respective side edges of said panel portions such that said edge wall portions of said side rails are substantially flush with said side edges of said panel portions; wherein plasticizing energy is applied to said integral step portions, while said panel portions are securely held against said flange portions, to fuse said side rails to said enclosure to form said package; the improvement comprising making the inside surfaces of said edge wall portion of each of said side rails extend away from said perpendicularly-disposed, intermediate flange portion to provide room for excess molten plastic from the respective one of said integral step portions in said channels.

2. The record package as defined in claim 1 wherein said step portions are disposed on said intermediate flange portions.

3. The record package as defined in claim 1 wherein said energy is in the form of ultrasonic vibrations.

4. The record package as defined in claim 1 wherein said T-cross sectioned side rails are attached to the opposite sides of said U-shaped enclosure to form a record access opening on the side of said enclosure oppositely disposed from said end portion.

* * * * *